US012626686B1

(12) United States Patent　　(10) Patent No.:　US 12,626,686 B1

Chong et al.　　(45) Date of Patent:　May 12, 2026

(54) CROSS-LINGUAL VOICE CLONING FOR LOW-RESOURCE LANGUAGES

(71) Applicant: Zoom Video Communications, Inc., San Jose, CA (US)

(72) Inventors: Dading Chong, Hangzhou (CN); Dongyang Dai, Hangzhou (CN); Xiao Song, Hangzhou (CN); Chao Wang, Hangzhou (CN); Sheng Yuan, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 252 days.

(21) Appl. No.: 18/225,750

(22) Filed: Jul. 25, 2023

(51) Int. Cl.
　　G10L 15/26　　(2006.01)
　　G10L 13/08　　(2013.01)
(52) U.S. Cl.
　　CPC .............. G10L 13/08 (2013.01); G10L 15/26 (2013.01)
(58) Field of Classification Search
　　None
　　See application file for complete search history.

(56) References Cited

U.S. PATENT DOCUMENTS

| | | | | |
|---|---|---|---|---|
| 11,410,684 | B1 * | 8/2022 | Klimkov | G10L 13/027 |
| 11,990,117 | B2 * | 5/2024 | Chen | G06N 3/047 |
| 12,198,674 | B2 * | 1/2025 | Wu | G10L 13/06 |
| 12,443,797 | B1 * | 10/2025 | Desai | G06F 40/205 |
| 2019/0102378 | A1 * | 4/2019 | Piernot | G06F 40/295 |
| 2019/0251952 | A1 * | 8/2019 | Arik | G10L 13/08 |
| 2020/0082806 | A1 * | 3/2020 | Kim | G10L 13/033 |
| 2020/0380952 | A1 * | 12/2020 | Zhang | G10L 13/08 |
| 2021/0174807 | A1 * | 6/2021 | Mohapatra | H04M 3/53333 |
| 2022/0246130 | A1 * | 8/2022 | Baughman | G10L 13/033 |
| 2022/0246136 | A1 * | 8/2022 | Yang | G06N 3/094 |
| 2024/0194177 | A1 * | 6/2024 | Pavlovsky | G06F 40/58 |
| 2025/0111173 | A1 * | 4/2025 | Wu | G06F 16/3337 |
| 2025/0349282 | A1 * | 11/2025 | Li | G10L 15/02 |

OTHER PUBLICATIONS

Schenider et al., wav2vec: Unsupervised Pretraining For Speech Recognition, Apr. 11, 2019, 4 pages.

(Continued)

*Primary Examiner* — Neeraj Sharma

(74) *Attorney, Agent, or Firm* — Kilpatrick Townsend & Stockton, LLP

(57)　　　　ABSTRACT

Techniques for cross-lingual voice cloning for low-resource languages are provided. In an example method, a computing device receives a first speech sample, the first speech sample characterized by a first voice and spoken in a first language and a text input in a second language. The computing device generates, using a first trained ML model trained to encode the text input to an encoded representation that characterizes the text input spoken in a second voice in the second language, the encoded representation of the text input. The computing device generates, using a second trained ML model trained to generate a spectrogram based on the encoded representation of the text input spoken in the second language, the spectrogram of the text input, the spectrogram characterized by the text input spoken in the first voice in the second language. The computing device generates an audio output based on the spectrogram.

20 Claims, 9 Drawing Sheets

(56) References Cited

OTHER PUBLICATIONS

Gulati et al., Conformer: Convolution-Augmented Transformer for Speech Recognition, May 16, 2020, 4 pages.

Kong et al., HiFi-GAN: Generative Adversarial Networks for Efficient and High Fidelity Speech Synthesis, Abstract, 2020, 1 page.

Jia et al., "Transfer Learning From Speaker Verification to Multispeaker Text-To-Speech Synthesis", Jan. 2, 2019, 4 pages.

Shen et al., "Natural TTS Synthesis By Contributions WaveNet on Mel Spectrogram Predictions", Feb. 18, 2018, 4 pages.

Ren et al., "Fast Speech and High-Quality End-to-End Text Speech", Aug. 8, 2022, 4 pages.

Vaswani et al., "Attention is All You Need", Abstract, Jul. 24, 2023, 15 pages.

* cited by examiner

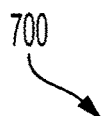

700

RECEIVE A FIRST SPEECH SAMPLE, THE FIRST SPEECH SAMPLE CHARACTERIZED BY A FIRST VOICE AND SPOKEN IN A FIRST LANGUAGE
710

RECEIVE A TEXT INPUT IN A SECOND LANGUAGE
720

GENERATE, BY A FIRST TRAINED ML MODEL, THE ENCODED REPRESENTATION OF THE TEXT INPUT
730

GENERATING, BY A SECOND TRAINED ML MODEL, THE SPECTROGRAM OF THE TEXT INPUT
740

GENERATE AN AUDIO OUTPUT BASED ON THE SPECTROGRAM
750

FIG. 7

CROSS-LINGUAL VOICE CLONING FOR LOW-RESOURCE LANGUAGES

FIELD

The present application generally relates to speech synthesis, and more particularly relates to techniques for cross-lingual voice cloning for low-resource languages.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 shows an example of a system for cross-lingual voice cloning for low-resource languages, according to some aspects of the present disclosure.

FIG. 5 shows an example of a system for cross-lingual voice cloning for low-resource languages, according to some aspects of the present disclosure.

FIG. 7 shows a flowchart of an example method 700 for cross-lingual voice cloning for low-resource languages.

DETAILED DESCRIPTION

Figure 1:
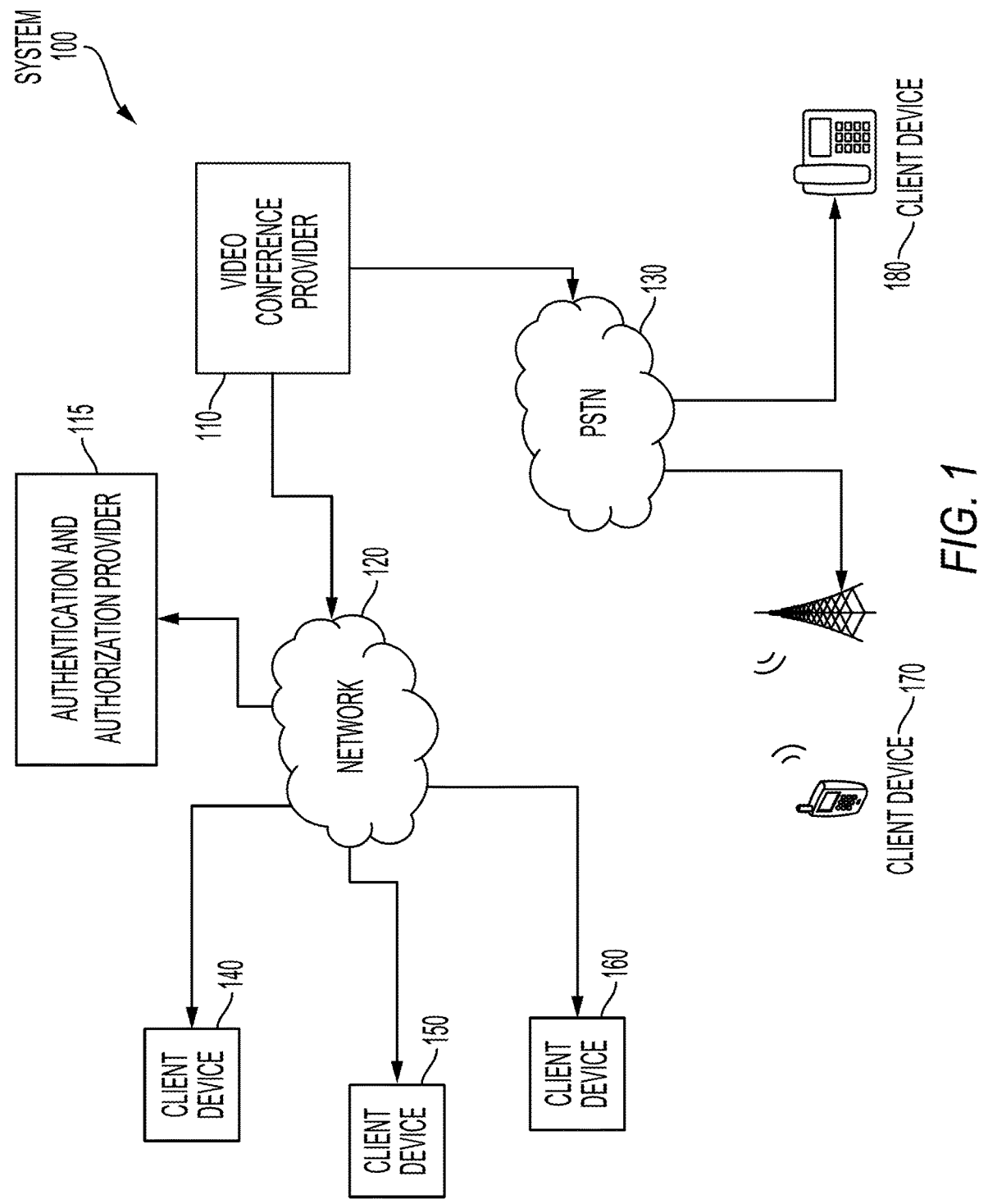
FIG. 1 shows an example system that provides videoconferencing functionality to various client devices.

Examples are described herein in the context of systems and methods for cross-lingual voice cloning for low-resource languages. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is, by now, an omnipresent backdrop for much of personal and business communications. As video conferencing has become more prevalent, particularly with regards to remote, global teams, the associated technologies have grown to meet the challenges that have accompanied connecting diverse, multi-lingual teams from varied backgrounds and cultures.

One group of technologies that has an increasing role to play in the context of cross-border video conferencing relates to speech synthesis. For example, text-to-speech (TTS) synthesis may be used for the generation of audible speech when participants are unable to speak or when speech is unavailable for some reason. Additional TTS applications include multilingual real-time translation, virtual assistants, expanded accessibility functionality, and so on.

In some cases, it may be desirable to synthesize speech using a particular voice. The voice of synthesized speech refers to the sound produced by a particular individual when speaking, encompassing both physical and prosodic characteristics. Physical traits include aspects like pitch and timbre, while prosodic elements include rhythm, pace, and intonation. Consider the example of a video conference that provides multilingual real-time translation. During the video conference, a participant may speak in a first language. The speech may be transcribed, translated into a second language, and then synthesized using a TTS component. The TTS component may be configured to synthesize the translated speech using a synthetic "voice" provided by the TTS component. Such TTS components may include a machine learning (ML) model that has been trained to synthesize speech using training data that includes a variety of voices. Thus, the TTS component outputs synthetic speech according to the voice derived from the training data.

In general, a TTS component may generate speech using one of a set of available voices corresponding the to training data used while training the TTS component. For example, a user of a TTS component may select a voice described as "high-pitched American male" or "low-pitched Japanese female." However, some use cases call for the use of specific voices when performing TTS. The synthesis of speech using a specific voice is referred to a voice cloning. For example, in the example above, it may be desirable to synthesize the translated speech of the participant using the participant's own voice, rather than a voice derived from the data used to train the TTS component.

An analogous challenge exists where a relatively small amount of training data is available for the target language. A low-resource language refers to a language that lacks sufficient digital resources for training some ML applications. These resources may include machine-readable texts like digital books, newspapers, and websites, corresponding speech data, or other recordings of spoken language. In some cases, resource for training ML applications may include annotated corpora, which include collections of language data that have been labeled with additional linguistic information, like parts of speech or semantic roles. When the target language is a low-resource language, the traditional approach to training the TTS model using a variety of voices may be impractical or impossible due to unavailable or prohibitively expensive training data.

Techniques for cross-lingual voice cloning for low-resource languages are disclosed herein. In an example method, a video conference provider provides a voice cloning service that can synthesize speech in a particular voice given a sample of the particular voice in one language and a text input in another. As used herein, "cross-lingual" refers to the training or application of machine learning (ML) models across one or more languages. An ML model may use learnings from one language to inform its operations in a different language.

In the example method, the video conference provider first receives an audio speech sample. The audio speech sample has a voice. The voice may include the combination of characteristics that makes a human voice sound distinctive such as gender, age, accent, speed, pitch, and so on. The audio speech sample is also in a particular language. For example, the audio speech sample may be in English.

The video conference provider then receives a text input in another language. The other language may be a low-resource language. A low-resource language refers to a language that lacks sufficient examples for training and using ML applications, like appropriately prepared digital books, newspapers, and websites. For example, the text input may be in Japanese, Hindi, or Irish.

The video conference provider contains several "trained" ML models that are used in cross-lingual voice cloning for low-resource languages. First, a first ML model is used to encode the text input into an encoded representation. The encoded representation may be a digital representation of the text input that can be processed by downstream components for the synthesis of speech. The encoded representation is sometimes referred to as a "bottleneck" because the encoded representation is a compressed version of the text input.

The first ML model is trained by providing inputs to it, examining the outputs, and updating the parameters of the first ML model to make the output converge on the desired output. In this case, the first ML model is trained using "training data" consisting of pairs of text and audio of words or phrases in a low-resource language like Japanese. During training, the audio training data is converted into encoded representation using the encoder component of an automatic speech recognition (ASR) ML model. An ASR ML model is an ML model that is trained to convert spoken language into a written form. Such ML models may include a number of components, but the present disclosure uses only an encoder component included in some ASR implementations. The ASR encoder can transform the input audio into a compressed representation that captures essential information in the input audio. For example, the first ML model can be trained to generate an encoded representation of a Japanese text input using a small collection of Japanese text and audio pairs.

The video conference provider then generates, using a second trained ML model, a spectrogram of the encoded representation of the text input. A spectrogram is a representation of frequencies in an audio signal as they vary over time. The second trained ML model is trained to generate the spectrogram of the audio that would be produced if the text input were spoken in the voice of the audio speech sample (i.e., to "clone" the voice of the audio speech sample).

The second trained ML model may be trained using training data consisting of embedded representations of speech samples in another language that may have plentiful data available, in contrast to a low-resource language. An embedded representation may be an encoding that captures not only the data itself but also the relationships and context between different pieces of data. The second ML model can be trained to produce spectrograms of the encoded representation of the text input in the context of the embedded representations (e.g., conditioned on the embedded representations). For example, the second trained ML model can be trained using English speech samples (a high-resource language) to output a spectrogram characterized by the text input spoken in the voice of the audio speech sample in Japanese (a low-resource language).

Finally, the video conference provider generates an audio output based on the spectrogram. For example, the spectrogram may be converted into an audio output format that can be played on an audio output device like a speaker. A voice encoder or vocoder may be used to convert the spectrogram to an audio output format. The vocoder may be a trained ML model that is trained to generate a realistic-sounding audio output that corresponds to a given spectrogram.

The innovations of the present disclosure constitute significant improvements in the fields of speech synthesis and voice cloning. Some existing techniques for cross-lingual voice cloning are based on multi-speaker text-to-speech (TTS) synthesis ML models. Multi-speaker TTS synthesis ML models are trained to synthesize speech using a selected voice from among multiple different speakers included in the training data. Such models may be trained on a large dataset of speech from thousands of speakers. Training data suitable for multi-speaker TTS synthesis ML models may only be readily available or affordable for high-resource languages. For low-resource languages, such as Japanese or Irish, sufficient training data may be unavailable, prohibitively expensive, or difficult to obtain. Thus, prior to the present disclosure, cloning voices into low-resource languages was expensive, difficult, and in some cases, impossible.

The innovations of the present disclosure enable voice cloning into a low-resource language by training a portion of the underlying TTS synthesis ML model with as few as one set of audio samples of the target low-resource language. At the same time, another portion of the underlying TTS synthesis ML model is trained with larger quantities of cheaply, readily available training data (e.g., English). Thus, the techniques disclosed herein can add several previously unattainable functions and benefits to cross-lingual voice cloning systems. For example, virtual assistants or digital narrators can be customized to use a voice sample available in a low-resource language. In another example, cross-lingual voice cloning can enable dubbing of foreign media content into the low-resource target language.

The techniques of the present disclosure are also an improvement to voice cloning technologies specifically in the context of video conferencing. For example, a video conference provider can enable real-time translation during video conferencing using a specific voice and a transcribed audio from the low-resource target language. Cross-lingual cloning may improve the accessibility features of video conferences by allowing personalization of audio output for individuals with auditory processing disorders. For international video conferences with online translators, cross-lingual voice cloning can enable real-time translation in the voice of the original speaker.

These illustrative examples are given to introduce the reader to the general subject matter discussed herein and the disclosure is not limited to these examples. The following sections describe various additional non-limiting examples and examples of systems and methods for cross-lingual voice cloning for low-resource languages.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
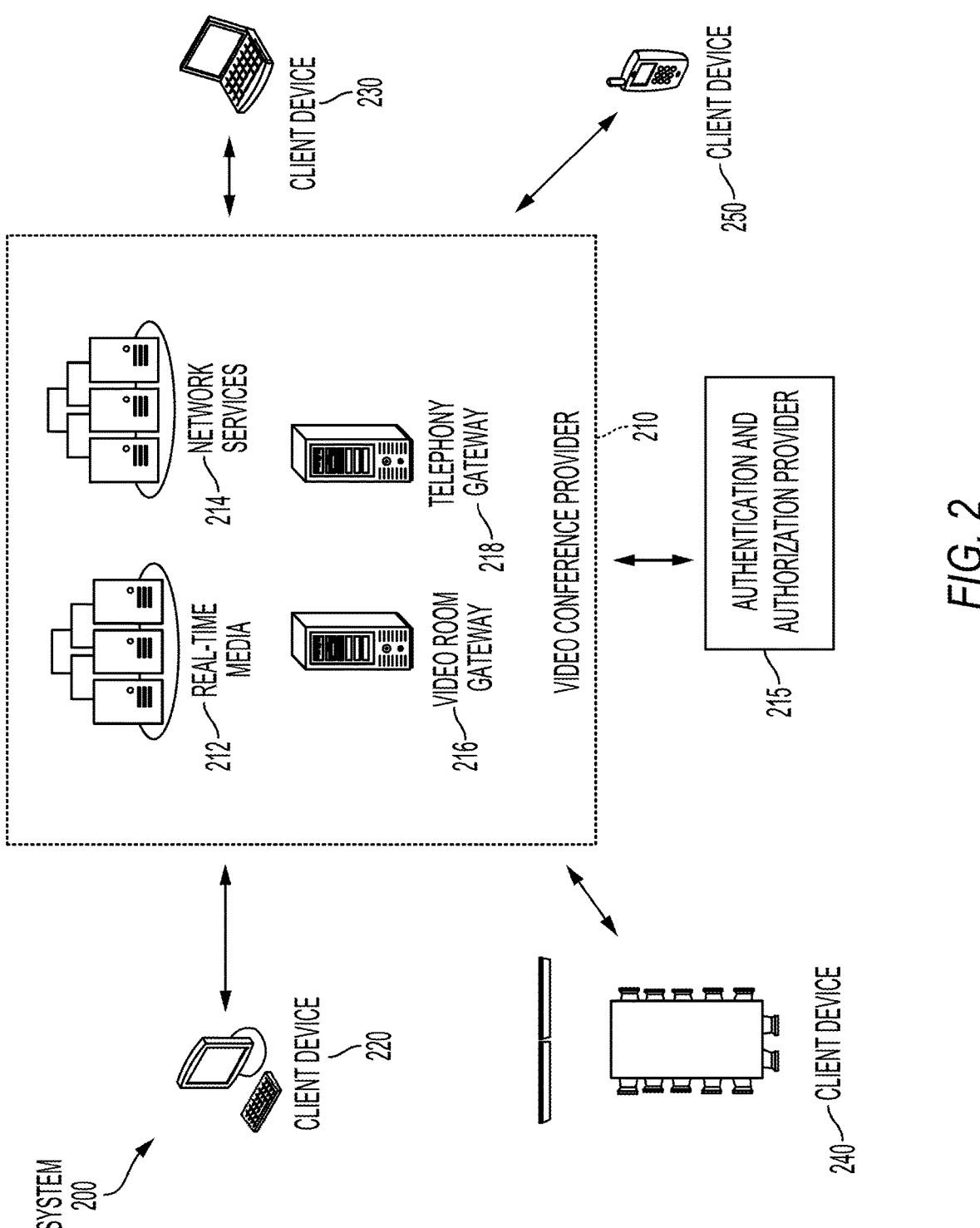
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it.

Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
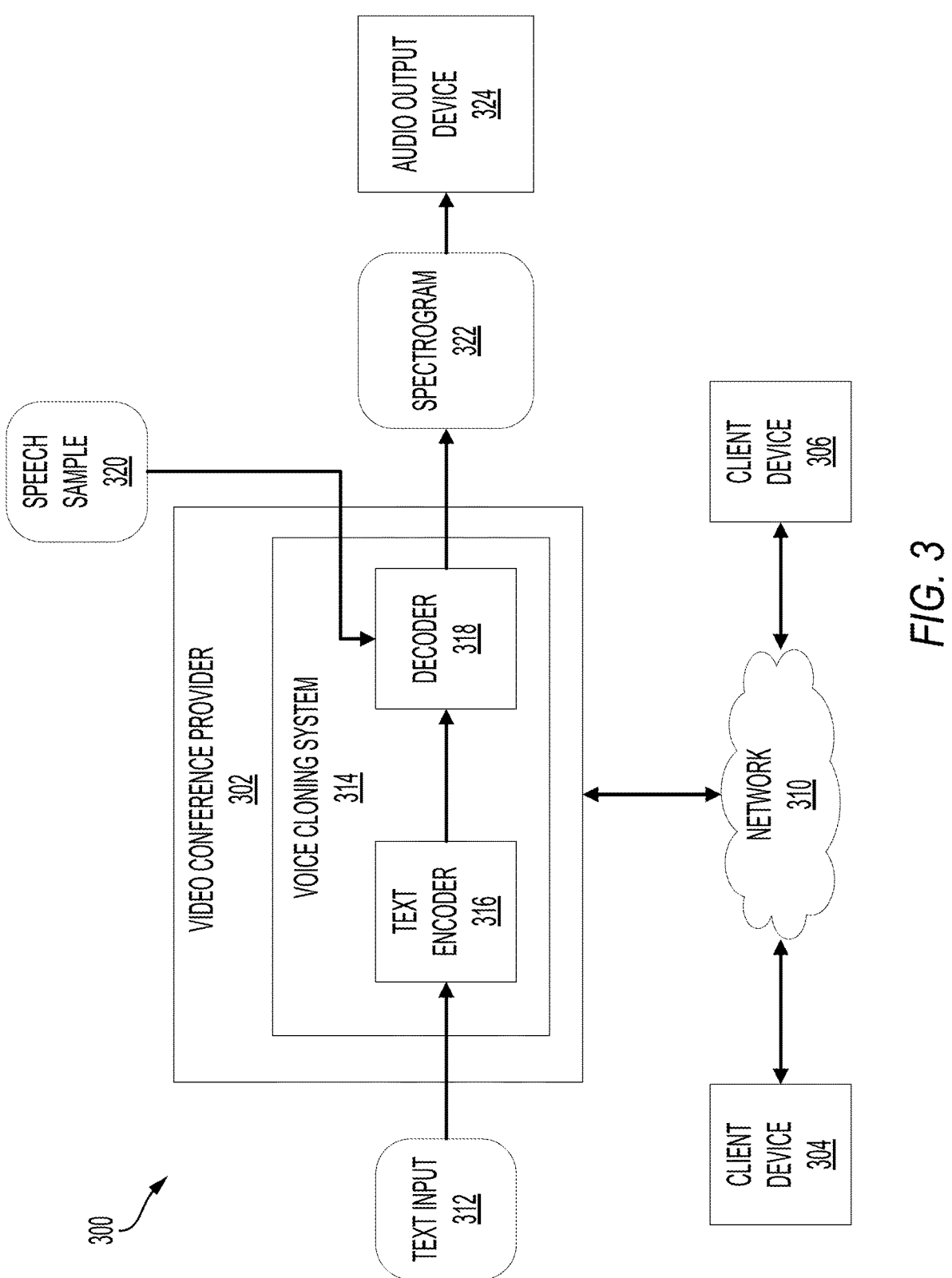
FIG. 3 shows an example of a system for cross-lingual voice cloning for low-resource languages, according to some aspects of the present disclosure.

Referring now to FIG. 3, FIG. 3 shows an example of a system 300 for cross-lingual voice cloning for low-resource languages, according to some aspects of the present disclosure. One or more client devices 304, 306 are communicatively coupled with a video conference provider 302. For example, the client devices 304, 306 may be coupled to the video conference provider over a network 310. The network 310 can include public networks, private networks, the Internet, or any other suitable combination of networked devices.

In example system 300, the video conference provider 302 may host a video conference with one or more participating client devices 304, 306. The video conference may include the video streams of each participant being sent from each respective client device to the video conference provider and then to the client devices 304, 306 of the remaining participants. For example, example system 300 depicts two client devices 304, 306 that may be participants in a video conference.

Likewise, the video conference may include one or more audio streams. An audio stream may include the audio captured by an audio input device for one or more participants. The audio stream may be sent by the client devices 304, 306 to the video conference provider 302 over the network 310. The video conference provider 302 may then send the audio stream to the other participants for playback.

Turning now to a particular client device 304, the client device 304 may be a personal computer, laptop, smartphone, tablet, or similar device. The client device 304 may include one or more audio input devices 324 for capturing audio for video conference participation. For example, the client device 304 may have a connected external microphone or an embedded internal microphone. The client device 304 may include one or more audio output devices 324 for playing back audio received from the video conference provider 302 associated with the other client device(s) 306. For example, the audio output devices 324 may include a speaker or headphones.

During the video conference, client device 304 may send an indication to video conference provider 302 requesting voice cloning services. For example, voice cloning services may be provided by voice cloning system 314. Voice cloning may be used in various applications including, for example, real-time translation to low-resource languages, accessibility features, multi-lingual voice assistant integration, multilingual virtual event hosting, and so on.

Figure 4:
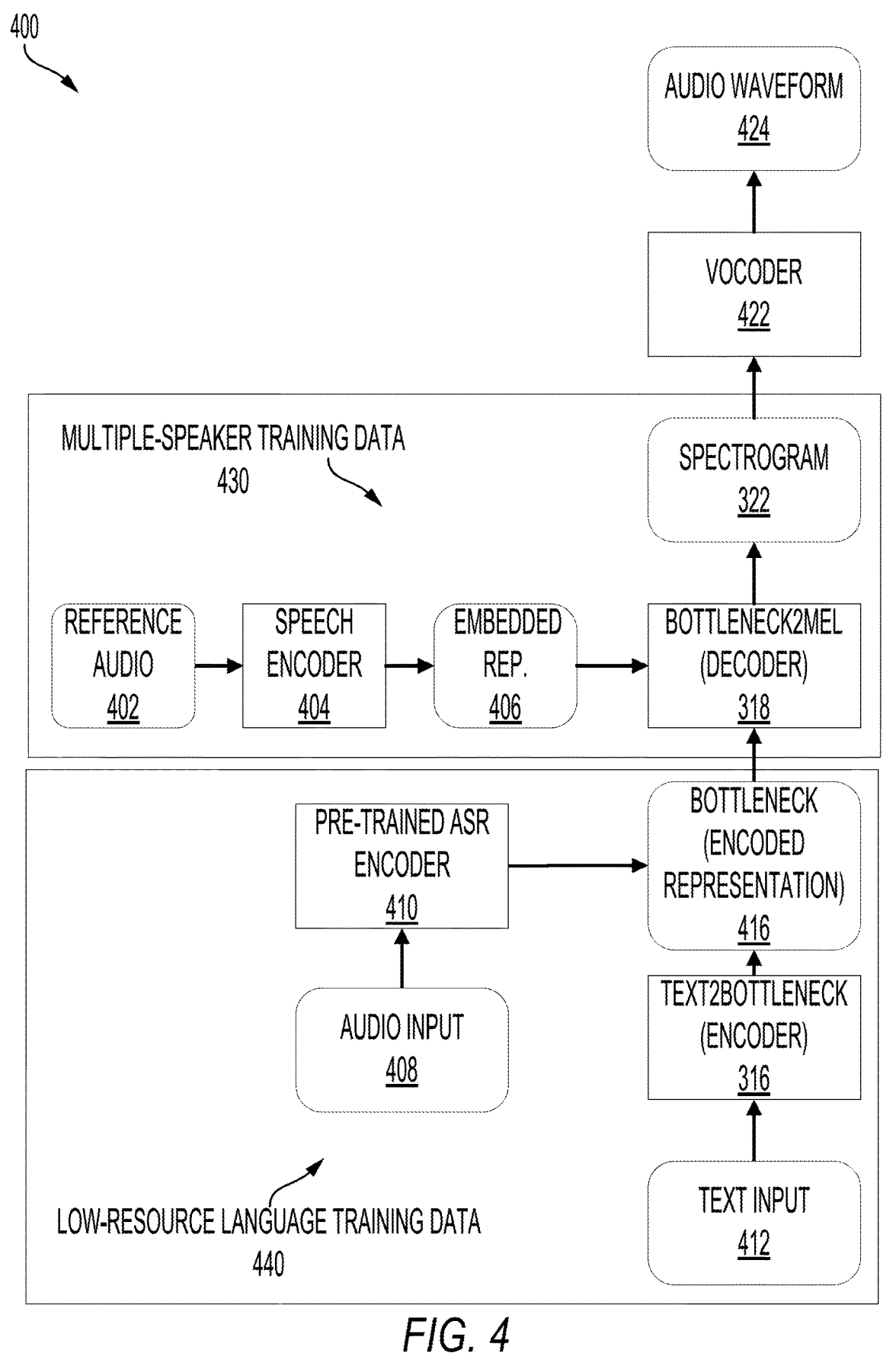
Figure 5:
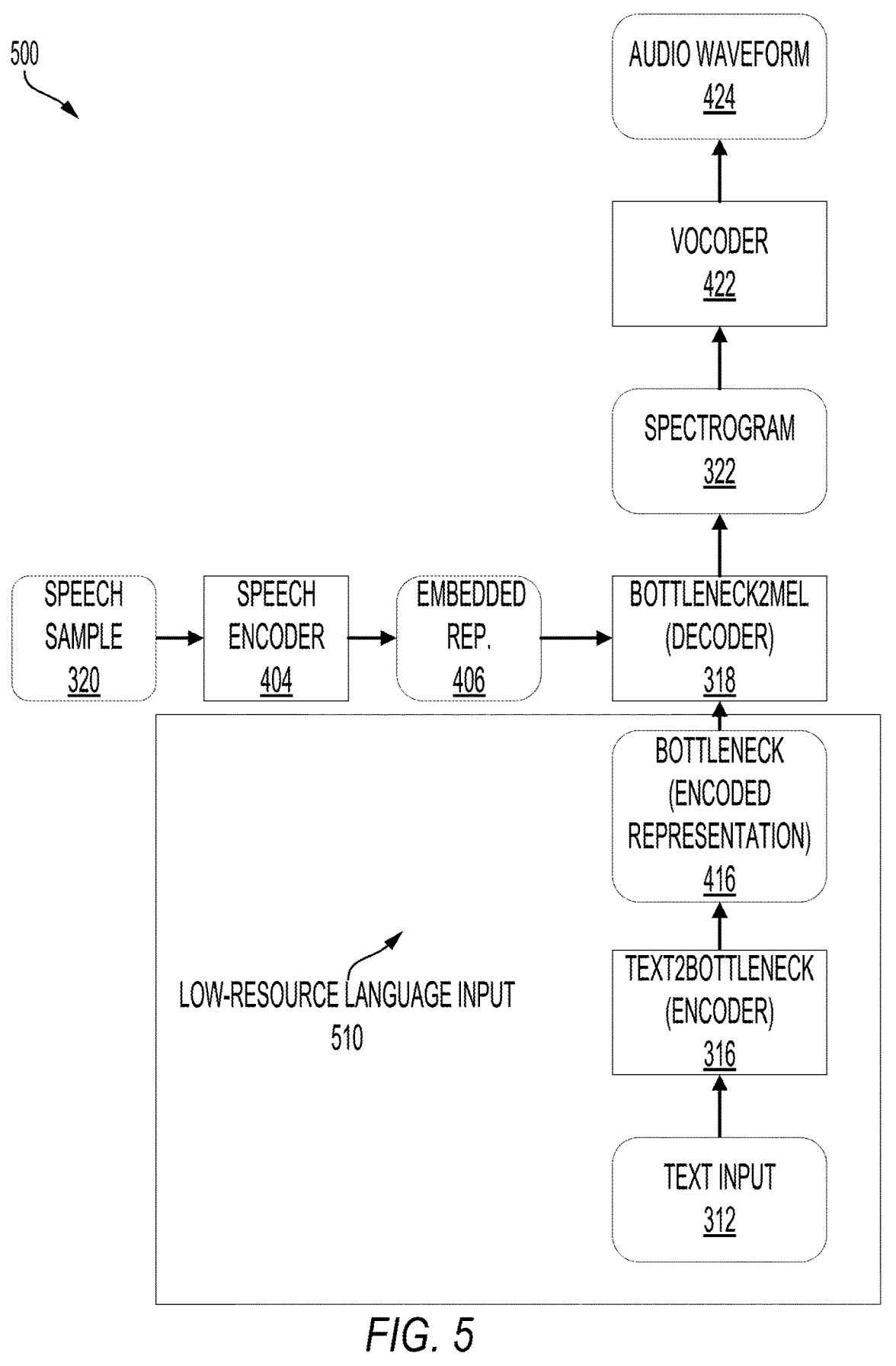

Voice cloning system 314 may include components for utilizing trained machine learning (ML) models for cross-lingual voice cloning for low-resource languages. Voice cloning system 314, as depicted in FIG. 3, is shown in inference mode, in which the ML models are trained models being used for speech synthesis. Detailed example voice cloning systems in training and inference modes are shown in FIGS. 4 and 5, respectively. In one example, voice cloning system 314 includes a text encoder 316 and a decoder 318. Some examples may perform training and inference simultaneously and train "online," improving the ML models continuously while in inference mode.

In example system 300, while in inference mode, voice cloning system 314 receives a text input 312. The text input 312 may be in a low-resource language. A low-resource language refers to a language that lacks sufficient digital resources for some ML applications. These resources may include machine-readable texts like digital books, newspapers, and websites. They may include corresponding speech data, or recordings of spoken language. The resources may include annotated corpora, which include collections of language data that have been labeled with additional linguistic information, like parts of speech or semantic roles.

The text input 312 may be received in a format suitable for processing by text encoder 316. For example, the text input 312 may be received as plain text using a standardized alphabet of the low-resource language. In some other examples, the text input 312 may be received as International Phonetic Alphabet (IPA) transcriptions, as phonemes according to a standardized notation or format, as graphemes, as textual data derived from an Automatic Speech Recognition (ASR) system, or another proprietary or domain-specific text format that the text encoder 316 is configured to receive.

In example system 300, voice cloning system 314 includes a text encoder 316. The text encoder 316 may include one or more transformer and feed-forward blocks but may have other configurations. The text receives the text input 312 and may apply a tokenization process, breaking down the input into smaller, more manageable pieces known as tokens. For example, the text encoder 316 may include a tokenizer component that converts the text input 312 string into a series of smaller pieces (tokens) according to language-specific rules. For example, the tokenizer may tokenize an English string into words, but tokenize a Chinese string into sub-word units. Some tokenizer implementations may add special tokens used by downstream ML models like "start of sentence" or "end of sequence" tokens.

The tokenized text input 312 may be passed through a series of neural network layers (e.g., feed-forward layers) and self-attention mechanisms (e.g., transformer layers) to convert the tokenized text input 312 into an encoded representation. The encoded representation may be a numerical representation of the text input 312 that accords with the process used to train the text encoder 316.

For example, the text encoder 316 may be trained to encode the text input 312 to an encoded representation that characterizes the text input 312 in the low-resource language that can be provided as input to the decoder 318. In some examples, an ASR encoder may be used to train the text encoder 316 to generate the encoded representation, as is discussed in detail in FIG. 4 and the accompanying description.

Voice cloning system 314 includes a decoder 318. The decoder 318 may be trained to generate a spectrogram 322 based on the encoded representation of the text input 312 spoken in the low-resource language. The decoder 318 may be trained separately from the text encoder 316 using multiple-speaker training data in a high-resource language. Like the text encoder 316, the decoder 318 may include one or more transformer and feed-forward blocks.

The decoder 318 receives speech sample 320. In some examples, the speech sample 320 is processed by a speech encoder 404 that can generate an embedded representation of the speech sample 320. Speech encoder 404 may be a pre-trained model including variations like a deep neural network, Long Short-Term Memory (LSTM) or another recurrent neural network (RNN), transformer model, or other suitable ML model. In some examples, a transformer model can be adapted from a pre-existing model originally trained for text including examples such as Bidirectional Encoder Representations from Transformers (BERT) or a Generative Pre-trained Transformer (GPT) variant.

The speech sample 320, while in inference mode, corresponds to the desired voice to clone to. For example, the speech sample 320 may be an audio sample of the desired target voice of a suitable duration and quality for the desired quality of synthesized speech. In general, the length of the speech sample 320 can range between several minutes to several hours.

The decoder 318 is trained to convert the output of the text encoder 316 to spectrogram 322 conditioned on the embedded representation of speech sample 320. A spectrogram is a representation of frequencies in an audio signal as they vary over time. The spectrogram 322 may be characterized by the text input 312 spoken in the voice of the speech sample 320 in the low-resource language. In some examples, spectrogram 322 is a Mel spectrogram. A Mel spectrogram utilizes the Mel scale, which approximates the human ear's response to different frequencies.

Spectrogram 322 can be converted into an audio waveform and played back on audio output device 324. Because phase information may not be encoded in the predicted spectrogram 322, a reconstruction algorithm may be required to obtain the time domain signal corresponding to a given spectrogram 322. For example, an algorithm such as the Griffin-Lim algorithm may be used, which iteratively estimates the phase of the signal and synthesizes the time-domain signal from the predicted spectrogram 322. Other approaches may be used, such as iterative computation of the inverse-short time Fourier transform. Each approach, however, requires assumptions about the original input signal which is not available in the case of ML predictions. Thus, the accuracy of the reconstructed waveform may be limited. Some embodiments may include several reconstruction algorithms that can be selected and configured according to the requirements of a particular context.

The reconstructed time domain signal may include raw waveform data stored in a format such as WAV or AIFF. The raw waveform data can be saved or encoded into a popular audio format like MP3 using an audio encoder. The saved encoded audio can be played back using a suitable audio output device 324. For example, the audio waveform 424 can be encoded into a digital audio file format, such as MP3, OGG, AAC, etc., which are commonly used for storing audio data with varying degrees of compression. The resulting file can then be stored, transferred, or played back using audio output device 324.

In some examples, the spectrogram 322 may be received by a voice encoder (vocoder) neural network. For example, the vocoder may be a pre-trained generative adversarial network (GAN). The GAN can be trained to output an audio waveform corresponding to the input spectrogram 322. In some examples, use of a trained neural network may produce an audio waveform with greater accuracy than can be achieved using a reconstruction algorithm.

Referring now to FIG. 4, FIG. 4 shows an example of a system 400 for cross-lingual voice cloning for low-resource languages, according to some aspects of the present disclosure. System 400 illustrates an example implementation of voice cloning system 314 during training. Generally, the example system 400 is trained in two parts: the text encoder 316 is trained using low-resource language training data 440 and the decoder 318 is trained using multiple-speaker training data 430 that may use training data in an easily obtainable high-resource language.

The text encoder 316 is trained independently of the decoder 318. During training, the text encoder 316 receives pairs of text input 412 and the corresponding audio input 408, both written in or read in the low-resource language. Importantly, the voice of audio input 408 is arbitrary. This is possible because the text encoder 316 is trained to generate an encoded representation 416 that is language-independent. The text encoder 316 can be trained to model prosodic speech information, like stress, intonation, and rhythm, which can be trained on as few as one speaker's TTS data (e.g., a single set of audio input 408 and text input 412 pairs).

The audio input 408 is received by a pre-trained automatic speech recognition (ASR) encoder 410 taken from an ASR ML model. An ASR ML model is an ML model that is trained to convert spoken language into written form. Such models may include a number of components, but the present disclosure uses only the ASR encoder component included in some ASR implementations. The ASR encoder 410 can transform the input audio into a compressed representation that captures essential speech information while discarding noise or irrelevant details.

In some examples, the ASR encoder 410 may pass the audio input 408 through one or more neural network layers such as recurrent neural networks (RNNs), convolutional neural networks (CNNs), or transformer-based models, among other possible configurations. The ASR encoder can be trained to output a sequence of vector representations which is the language-independent encoded representation 416. The encoded representation 416 may include some salient features of the audio input 408 signals in a compressed form.

During training, the text encoder 316 is trained to output the encoded representation 416 output by the ASR encoder 410. The encoded representation 416 is sometimes referred to as a "bottleneck." Accordingly, in some examples, the text encoder 316 can be referred to as the text2bottleneck 316 component and the decoder 318 as the bottleneck2mel 318 component to emphasize the language-independent linkage between the separately-trained text encoder 316 and decoder 318.

The encoded representation 416 is used as input to train the decoder 318. The decoder 318 is trained using multi-speaker training data 430 in an arbitrary language, but typically a high-resource language for which training data is readily available, cheap, and easy to license. The training data may contain a multitude of reference audio 402 that is received by the speech encoder 404 for conversion to embedded representation 406.

The speech encoder 404 may be a pre-trained ML model that is trained to capture speaker-specific characteristics from the spoken input using a large, diverse training data set including a variety of voices. During training, the speech encoder 404 can generate an embedded representation 406 of the reference audio 402. The embedded representation 406 may be language-independent and may capture the vocal characteristics of the speaker (e.g., voice timbre).

The embedded representation 406 may be received by the decoder 318 along with the corresponding encoded representation 416 generated by the trained ASR encoder 410 and text encoder 316. The decoder 318 can then be trained to model the timbre information of the embedded representation 406 of the text input 412 conditioned on the embedded representation 406 to generate a spectrogram 322. In some examples, a Mel spectrogram may be generated.

The spectrogram output by the decoder 318 can be input to a vocoder 422 neural network that can be trained to produce audio waveform 424 given a spectrogram 322 input. The audio waveform 424 may be a time-domain audio signal representing the amplitude of the audio signal at successive points in time. The audio waveform 424 may be output by vocoder 422 using a suitable format and stored in a memory device prior to conversion to a format that can be played back.

In some examples, the vocoder 422 neural network may be a generative adversarial network (GAN). The vocoder 422 may be, for instance, a pre-trained GAN. A GAN may include a generator network, which produces outputs, and a discriminator network, which attempts to differentiate between the generated outputs and real data. The two networks can be trained together such that the generator is trained to generate realistic audio waveforms 424 while the discriminator is trained to determine whether the audio waveforms 424 are real or fake. The accuracy of the discriminator's classification can be used as feedback to train both the generator and the discriminator during backpropagation.

The audio waveform 424 can be played back using a suitable audio output device 324. For example, the audio waveform 424 can be encoded into a digital audio file format, such as WAV or OGG, which are commonly used for storing audio data with varying degrees of compression. The conversion process may involve applying suitable compression or encoding algorithms to the audio waveform 424, and then writing the resulting data to a file along with any necessary headers or metadata. This resulting file can then be stored, transferred, or played back using audio output device 324.

Referring now to FIG. 5, FIG. 5 shows an example of a system 500 for cross-lingual voice cloning for low-resource languages, according to some aspects of the present disclosure. System 500 illustrates an example implementation of voice cloning system 314 during inference. As mentioned above, the text encoder 316 is trained independently of the decoder 318. As a result, during inference, the text input 312 and subsequent encoding process by text encoder 316 into encoded representation 416 is involves only low-resource language input 510.

As during training, text encoder 316 receives a text input 312. The text input 312 may be in a low-resource language. The trained text encoder 316 converts the text input 312 into an encoded representation 416 (bottleneck). The voice cloning system 314 also receives speech sample 320 that can be encoded by speech encoder 404. Speech encoder 404 can generate an embedded representation 406 of speech sample 320. Importantly, the speech sample 320 can be in any language and does not necessarily use the low-resource language 510 of text input 312 or the language of the multi-speaker training data 430.

Trained decoder 318 generates a spectrogram 322 of the encoded representation 416 of the text input 312 conditioned on the embedded representation 406. For instance, decoder 318 may generate a Mel spectrogram. The spectrogram 322 is received by vocoder 422. Vocoder 422 may be, for example, a pre-trained GAN, trained to generate an audio waveform 424 output suitable for playback on an audio output device 324.

Figure 6A:
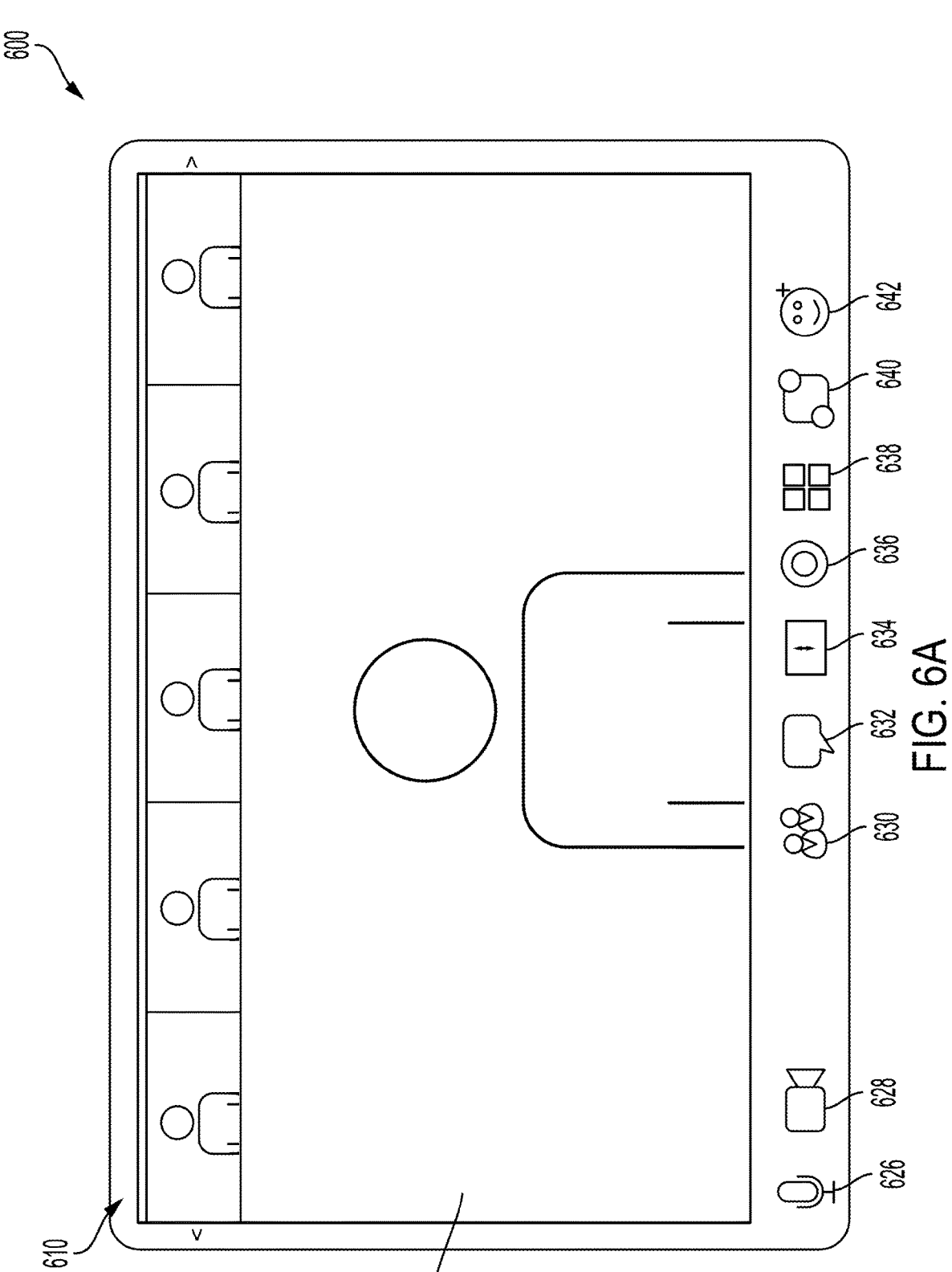
FIGS. 6A-B show illustrations of example graphical user interfaces that may be used with a system for cross-lingual voice cloning for low-resource languages, according to some aspects of the present disclosure.
Figure 6B:
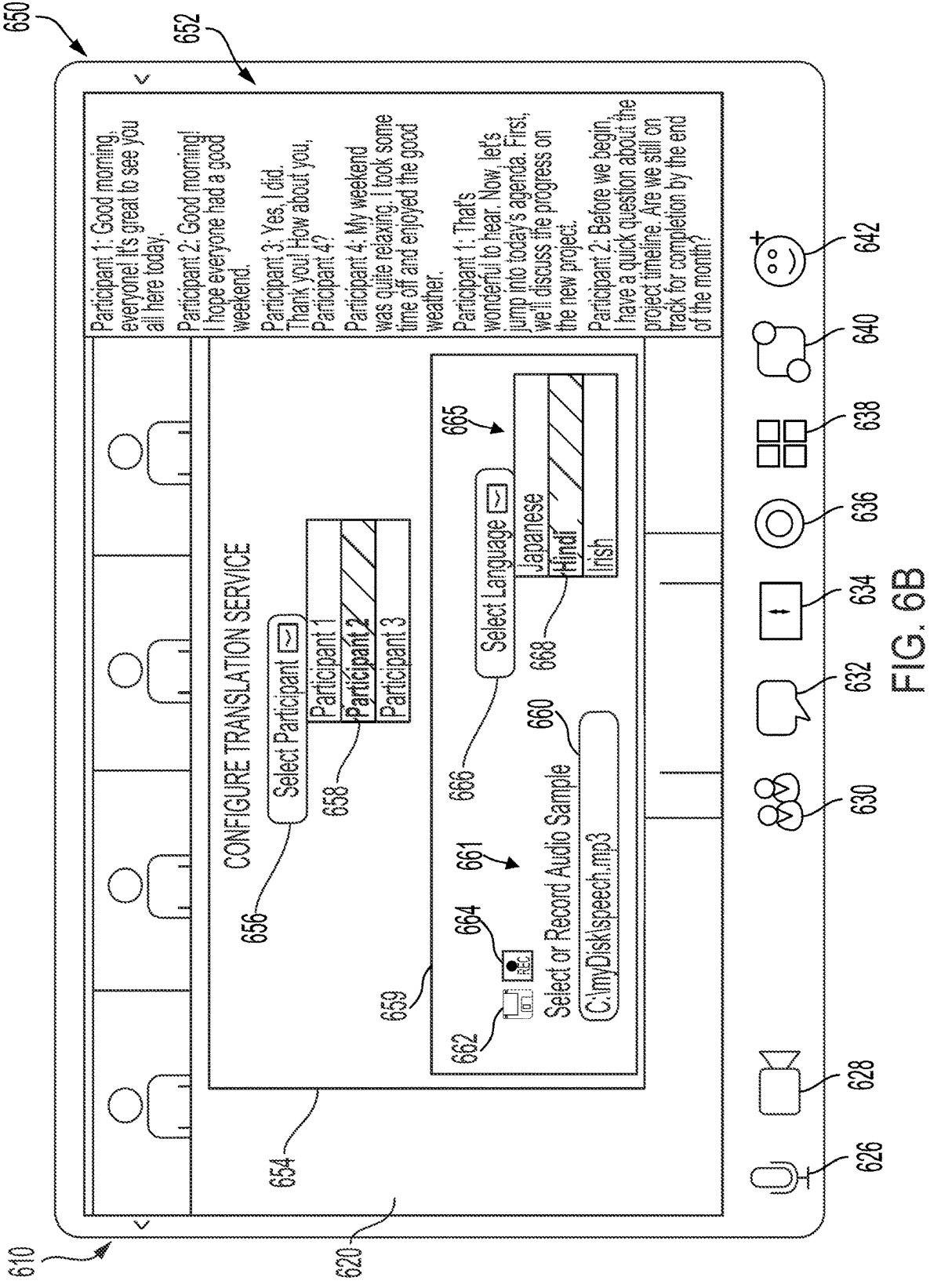

Turning next to FIGS. 6A-B, FIGS. 6A-B show illustrations of example graphical user interfaces (GUIs) that may be used with a system for cross-lingual voice cloning for low-resource languages, according to some aspects of the present disclosure. The example GUIs may be displayed, for example, on a screen included with client device 304.

FIG. 6A shows an example GUI 600 for a software client that can interact with a video conference provider, such as video conference provider 302, to allow a user to connect to the video conference provider 302, chat with other users, or join virtual conferences. A client device, e.g., client device 304, executes a software client as discussed above, which in turn displays the GUI 600 on the client device's display. In this example, the GUI 600 includes a speaker view window 620 that presents the current speaker in the virtual conference. Above the speaker view window 620 are smaller participant windows 610, which allow the participant to view some of the other participants in the video conference, as well as controls ("<" and ">") to let the host scroll to view other participants in the video conference.

Beneath the speaker view window 620 are a number of interactive elements 626-642 to allow the participant to interact with the virtual conference software. Controls 626-628 may allow the participant to toggle on or off audio or video streams captured by a microphone or camera connected to the client device. Control 630 allows the participant to view any other participants in the virtual conference with the participant, while control 632 allows the participant to send text messages to other participants, whether to specific participants or to the entire meeting. Control 634 allows the participant to share content from their client device. Control 636 allows the participant toggle recording of the meeting, and control 638 allows the user to select an option to join a breakout room. Control 640 allows a user to launch an app within the video conferencing software, such as to access content to share with other participants in the video conference. Control 642 allows a user to react or respond to an event during the video conference by, for example, expressing an emoji or raised hand icon visible by the other participants in the video conference.

A user may interact with such a GUI 600 when their client software is operating in a typical configuration, such as while at home or in an office. Thus, the user has full control over their audio and video settings, can freely chat with other participants, and can use any suitable audio or video encoders to provide high quality audio and video streams to other participants in a virtual conference. In other scenarios, the GUI 600 may be restricted to only allow functionality or to disable functionality.

FIG. 6B depicts a GUI 650 including an option for configuring a translation service provided by, for instance, the video conference provider 302. GUI 650 includes a transcript 652 of the video conference. In some examples, a transcript may be provided in real-time as the video conference proceeds. In other examples, the transcript may be obtained after the video conference is concluded based on a recording of the video conference. The video conference provider 302 may provide a transcription service that asynchronously generates a transcript at the completion of the video conference.

GUI 650 may include controls that control or invoke voice cloning services. For example, translation service dialog 654 may include an option to select a voice to clone to read back the transcript for each participant. Translation service dialog 654 may include a participant selector drop down control 656. Each participant may be separately configured for voice cloning. For example, the GUI 650 can be used to identify a particular participant 658. Selection of particular participant 658 can populate the participant configuration controls 659.

Participant configuration controls 659 includes a speech sample selection control 661. Speech sample selection control 661 can allow for identification or recording of a speech sample to provide the voice to be cloned into, corresponding to speech sample 320. Speech sample selection control 661 includes a load from disk control 662 and a record control 664. The user of GUI 650 can thus select a pre-recorded speech sample 320 or record a new one using controls provided by GUI 650 (not shown). In example speech sample selection control 661, a pre-recorded speech sample 320 is shown already selected in local disk selection box 660.

Participant configuration controls 659 includes a language selection control 665. Language selection control 665 can be used to select the target language for the translation using language selection drop down control 666. In some examples, the target language may be a low-resource language as shown in selected language 668. The selected language 665 may correspond to the language of text input 312. In some examples, the same language may be selected for all participants, such that the entire transcript 652 is translated into a single selected language 668 using synthesized speech for each participant, using the voice specified in, for example, local disk selection box 660 for each participant.

Various other voice services may be implemented in other video conferencing applications including improved accessibility, virtual assistants, or dubbing of foreign media content into a low-resource target language, and so on. One of ordinary skill in the art will recognize that similar controls to the example GUI 650 will be implemented for other applications.

Referring now to FIG. 7, FIG. 7 shows a flowchart of an example method 700 for cross-lingual voice cloning for low-resource languages. The description of the method 700 in FIG. 7 will be made with reference to FIGS. 3-6, however any suitable system according to this disclosure may be used, such as the example systems 100 and 200, shown in FIGS. 1 and 2.

It should be appreciated that method 700 provides a particular method for cross-lingual voice cloning for low-resource languages. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the video conference provider 302 during inference but other configurations are possible, such as the perspective of client device 304. One of ordinary skill in the art would recognize many variations, modifications, and alternatives.

The method 700 may include block 710. At block 710, the video conference provider 302 receives a first speech sample 320, the first speech sample 320 characterized by a first voice and spoken in a first language. In some examples, the speech sample 320 is processed by a speech encoder 404 that can generate an embedded representation 406 of the speech sample 320. The speech sample 320, during inference, corresponds to the desired voice to clone to. For example, an audio sample of the desired target voice may be obtained of a suitable duration and quality for the desired quality of synthesized speech. In general, the length of the speech sample 320 can range between several minutes to several hours.

The embedded representation 406 may be received by a decoder 418 that is trained to generate a spectrogram 322 of an encoded representation 416 of a text input 312 conditioned on the embedded representation 406. Thus, decoder 418 modulates the encoded representation 416 in accordance with the voice characteristics captured in the embedded representation 406, resulting in a spectrogram 322 that represents how the input text would sound if spoken in the target voice sampled in speech sample 320.

The method 700 may include block 720. At block 720, the video conference provider 302 receives a text input in a second language. As mentioned in block 710, the decoder 318 receives an encoded representation 416 of text input 312. The text input 312 may be in a suitable form for input to text encoder 316 including plain text (e.g., using graphemes), using a notation for phonemes like the International Phonetic Alphabet (IPA), among others.

Text encoder 316 may be a transformer-based or other suitable neural network. Text encoder 316 is trained to covert the text input 312 into an encoded representation 416 that may reflect the context, semantics, and other linguistic properties of the text input 312. Following a tokenization process, the text encoder 316 may convert each word or character into a corresponding numerical representation.

The method 700 may include block 730. At block 730, the video conference provider 302 generates, by a first trained ML model trained to encode the text input to an encoded representation that characterizes the text input spoken in a second voice in the second language, the encoded representation of the text input. For example, the first trained ML model may be text encoder 316. The text encoder 316 may be trained to encode the text input 312 to an encoded representation that characterizes the text input 312 spoken in the voice of speech sample 320 in the low-resource language of the text input 312. In some examples, an ASR encoder may be used to train the text encoder 316 to generate the encoded representation, as is discussed in detail in FIG. 4 and the accompanying description. The text encoder 316 may thus, in some examples, be trained to output an encoded representation 416 that matches the output of the ASR encoder.

The method 700 may include block 740. At block 740, the video conference provider 302 generates, by a second trained ML model trained to generate a spectrogram 322 based on the encoded representation 416 of the text input 312 spoken in the second language, the spectrogram 322 of the text input, the spectrogram 322 characterized by the text input 312 spoken in the first voice in the second language. For example, the second trained ML model may be decoder 318.

The encoded representation 416 is used as input to train the decoder 318. The decoder 318 is trained to generate a spectrogram 322 of the encoded representation 416 of the text input 312 conditioned on the embedded representation 406 of the speech sample provided by speech encoder 404. The speech encoder 404 may be a pre-trained ML model that is trained to capture speaker-specific characteristics from the spoken input using a large, diverse training data set including a variety of voices. In some examples, a Mel spectrogram may be generated that represents perceptually important frequencies.

The encoded representation 416 is sometimes referred to as a "bottleneck." accordingly, in some examples, the text encoder 316 can be referred to the text2bottleneck 316 component and the decoder 318 as the bottleneck2mel 318 component to emphasize the language-independent linkage between the separately-trained text encoder 316 and decoder 318.

In this paradigm, only the decoder 318 may be trained on multi-speaker data in an arbitrary language. Voice cloning given a text input 312 in a low-resource language can be performed using an ASR encoder to extract a language-independent bottleneck 416 during training of the text encoder 316. The bottleneck 416 can be used as a line of demarcation to device the voice cloning system 314 into a text2bottleneck 316 component and a bottleneck2mel 318 component.

The text2bottleneck 316 component can model the prosodic content of the text input 312 and associated audio input 408. The text2bottleneck 316 component can be trained on using samples from as few people as a single speaker. For instance, text2bottleneck 316 component can be trained using a single speaker's text-to-speech (TTS) synthesis training data. In contrast, the bottleneck2mel 318 component can model the timbre content of speech. The bottleneck2mel 318 component may be trained using multi-speaker training data, which can use an arbitrary, high-resource language, like English. Because the bottleneck 416 is language-independent, the multi-speaker training data used to train bottleneck2mel need not be limited to a particular language.

The method 700 may include block 750. At block 750, the video conference provider 302 generates an audio output based on the spectrogram. The spectrogram output by the decoder 318 can be input to a vocoder 422 neural network that can be trained to produce audio waveform 424 given a spectrogram 322 input. In some examples, the vocoder 422 neural network may be a generative adversarial network (GAN). The vocoder 422 may be, for instance, a pre-trained GAN. The audio waveform 424 can be played back using a suitable audio output device 324.

Figure 8:
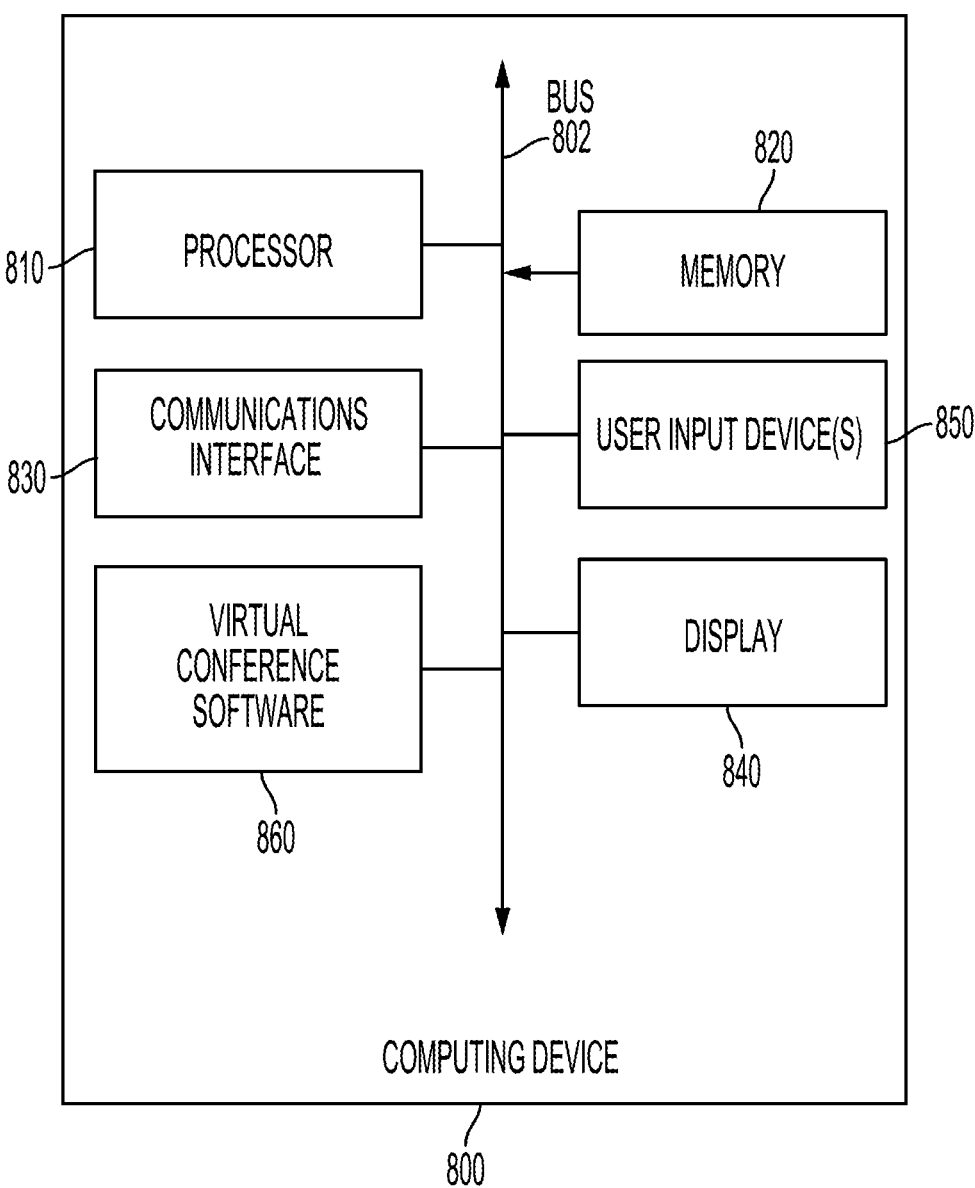
FIG. 8 shows an example computing device suitable for use in example systems or methods for cross-lingual voice cloning for low-resource languages, according to some aspects of the present disclosure.

Referring now to FIG. 8, FIG. 8 shows an example computing device 800 suitable for use in example systems or methods for providing cross-lingual voice cloning for low-resource languages according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for cross-lingual voice cloning for low-resource languages according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method, comprising: receiving a first speech sample, the first speech sample characterized by a first voice and spoken in a first language; receiving a text input in a second language; generating, by a first trained ML model trained to encode the text input to an encoded representation that characterizes the text input spoken in a second voice in the second language, the encoded representation of the text input; generating, by a second trained ML model trained to generate a spectrogram based on the encoded representation of the text input spoken in the second language, the spectrogram of the text input, the spectrogram characterized by the text input spoken in the first voice in the second language; and generating an audio output based on the spectrogram.

Example 2 is the method of example(s) 1, wherein training the first ML model to encode the text input to the encoded representation that characterizes the text input spoken in the second voice in the second language comprises: accessing a third trained ML model, wherein the third trained ML model is an automatic speech recognition encoder trained to generate the encoded representation; generating, by the third trained ML model, the encoded representation of the text input spoken in the second voice in the second language; and training the first ML model to generate the encoded representation generated by the third trained ML model.

Example 3 is the method of example(s) 1, further comprising generating an embedded representation of the first speech sample, wherein the embedded representation is generated by a third trained ML model, wherein the third trained ML model is trained to generate the embedded representation using language-independent training data.

Example 4 is the method of example(s) 1, wherein the first ML model is a transformer comprising one or more transformer blocks and one or more feed-forward blocks.

Example 5 is the method of example(s) 1, wherein the second ML model is a transformer comprising one or more transformer blocks and one or more feed-forward blocks.

Example 6 is the method of example(s) 1, wherein: the spectrogram is a Mel spectrogram; and generating the audio output based on the spectrogram comprises: receiving, by a vocoder, the Mel spectrogram; generating an audio waveform based on the Mel spectrogram; and playing back the audio waveform using an audio output device.

Example 7 is the method of example(s) 6, wherein the vocoder is a trained generative adversarial neural network.

Example 8 is the method of example(s) 1, wherein the text input comprises one or more characters, wherein the one or more characters include at least one of a grapheme or a phoneme.

Example 9 is a system comprising: one or more processors; and one or more computer-readable storage media storing instructions which, when executed by the one or more processors, cause the one or more processors to perform operations including: training a first machine learning (ML) model, comprising: generating, by a first trained ML model trained to generate an encoded representation of a particular speech input in a particular voice in a particular language, the encoded representation of a speech input, wherein the speech input is a first text input spoken in a first voice in a first language; and training the first ML model to generate the encoded representation generated by the first trained ML model based on the first text input; training a second ML model, comprising: generating, by a second trained ML model trained to generate an embedded representation using language-independent training data, an embedded representation of the speech input; and training the second ML model to generate a spectrogram based on the encoded representation of the first text input spoken in the first voice in the first language conditioned on the embedded representation; and generating, using the first ML model and the second ML model, the spectrogram of a second text input, the spectrogram characterized by the second text input spoken in the first voice in the first language.

Example 10 is the system of example(s) 9, wherein the first trained ML model is an automatic speech recognition encoder.

Example 11 is the system of example(s) 9, wherein the first ML model is a transformer comprising one or more transformer blocks and one or more feed-forward blocks.

Example 12 is the system of example(s) 9, wherein the second ML model is a transformer comprising one or more transformer blocks and one or more feed-forward blocks.

Example 13 is the system of example(s) 9, further comprising generating an audio output based on the spectrogram, wherein: the spectrogram is a Mel spectrogram; and generating the audio output based on the spectrogram comprises: receiving, by a vocoder, the Mel spectrogram; generating an audio waveform based on the Mel spectrogram; and playing back the audio waveform using an audio output device.

Example 14 is the system of example(s) 13, wherein the vocoder is a trained generative adversarial neural network.

Example 15 is the system of example(s) 9, wherein the second trained ML model trained to generate the embedded representation using language-independent training data comprises a convolutional neural network and one or more transformer blocks.

Example 16 is a non-transitory computer-readable medium storing instructions that, when executed by one or more processors, cause the one or more processors to perform operations including: receiving a first speech sample, the first speech sample characterized by a first voice and spoken in a first language; receiving a text input in a second language; generating, by a first trained ML model trained to encode the text input to an encoded representation that characterizes the text input spoken in a second voice in the second language, the encoded representation of the text input; generating, by a second trained ML model trained to generate a spectrogram based on the encoded representation of the text input spoken in the second language, the spectrogram of the text input, the spectrogram characterized by the text input spoken in the first voice in the second language; and generating an audio output based on the spectrogram.

Example 17 is the non-transitory computer-readable medium of example(s) 16, wherein training the first ML model to encode the text input to the encoded representation that characterizes the text input spoken in the second voice in the second language comprises: accessing a third trained ML model, wherein the third trained ML model is an automatic speech recognition encoder trained to generate the encoded representation; generating, by the third trained ML model, the encoded representation of the text input spoken in the second voice in the second language; and training the first ML model to generate the encoded representation generated by the third trained ML model.

Example 18 is the non-transitory computer-readable medium of example(s) 16, further comprising generating an embedded representation of the first speech sample, wherein the embedded representation is generated by a third trained ML model, wherein the third trained ML model is trained to generate the embedded representation using language-independent training data.

Example 19 is the non-transitory computer-readable medium of example(s) 16, wherein: the first ML model is a first transformer comprising one or more first transformer blocks and one or more first feed-forward blocks; and the second ML model is a second transformer comprising one or more second transformer blocks and one or more second feed-forward blocks.

Example 20 is the non-transitory computer-readable medium of example(s) 16, wherein: the spectrogram is a Mel spectrogram; and generating the audio output based on the spectrogram comprises: receiving, by a vocoder, the Mel spectrogram, wherein the vocoder is a trained generative adversarial neural network; generating an audio waveform based on the Mel spectrogram; and playing back the audio waveform using an audio output device.

That which is claimed is:

1. A method, comprising:
   receiving a first speech sample, the first speech sample characterized by a first voice and spoken in a first language;

receiving a text input in a second language, wherein the second language is a low-resource language;

generating, by a first trained machine learning ("ML") model trained using low-resource training data, to encode the text input to an encoded representation that characterizes the text input spoken in a second voice in the second language, a first encoded representation of the text input;

generating, by a second trained ML model trained using high-resource training data, to generate a spectrogram based on the first encoded representation of the text input spoken in the second language, a first spectrogram of the text input, the first spectrogram characterized by the text input spoken in the first voice in the second language, wherein the first trained ML model is different from the second trained ML model; and generating an audio output based on the spectrogram.

2. The method of claim 1, wherein training the first trained ML model to encode the text input to the encoded representation that characterizes the text input spoken in the second voice in the second language comprises:

accessing a third trained ML model, wherein the third trained ML model is an automatic speech recognition encoder trained to generate the encoded representation;

generating, by the third trained ML model, the encoded representation of the text input spoken in the second voice in the second language; and training the first trained ML model to generate the encoded representation generated by the third trained ML model.

3. The method of claim 1, further comprising generating an embedded representation of the first speech sample, wherein the embedded representation is generated by a third trained ML model, wherein the third trained ML model is trained to generate the embedded representation using language-independent training data.

4. The method of claim 1, wherein the first trained ML model is a transformer comprising one or more transformer blocks and one or more feed-forward blocks.

5. The method of claim 1, wherein the second trained ML model is a transformer comprising one or more transformer blocks and one or more feed-forward blocks.

6. The method of claim 1, wherein:

the first spectrogram is a Mel spectrogram; and generating the audio output based on the first spectrogram comprises:

receiving, by a vocoder, the Mel spectrogram;

generating an audio waveform based on the Mel spectrogram; and playing back the audio waveform using an audio output device.

7. The method of claim 6, wherein the vocoder is a trained generative adversarial neural network.

8. The method of claim 1, wherein the text input comprises one or more characters, wherein the one or more characters include at least one of a grapheme or a phoneme.

9. A system comprising:

one or more processors; and one or more computer-readable storage media storing instructions which, when executed by the one or more processors, cause the one or more processors to perform operations including:

receiving a first speech sample, the first speech sample characterized by a first voice and spoken in a first language;

receiving a text input in a second language, wherein the second language is a low-resource language;

generating, by a first trained ML model trained using low-resource training data, to encode the text input to an encoded representation that characterizes the text input spoken in a second voice in the second language, a first encoded representation of the text input;

generating, by a second trained ML model trained using high-resource training data, to generate a spectrogram based on the first encoded representation of the text input spoken in the second language, a first spectrogram of the text input, the first spectrogram characterized by the text input spoken in the first voice in the second language, wherein the first trained ML model is different from the second trained ML model; and generating an audio output based on the spectrogram.

10. The system of claim 9, wherein the first trained ML model is an automatic speech recognition encoder.

11. The system of claim 9, wherein the first trained ML model is a transformer comprising one or more transformer blocks and one or more feed-forward blocks.

12. The system of claim 9, wherein the second trained ML model is a transformer comprising one or more transformer blocks and one or more feed-forward blocks.

13. The system of claim 9, wherein:

the first spectrogram is a Mel spectrogram; and generating the audio output based on the first spectrogram comprises:

receiving, by a vocoder, the Mel spectrogram;

generating an audio waveform based on the Mel spectrogram; and playing back the audio waveform using an audio output device.

14. The system of claim 13, wherein the vocoder is a trained generative adversarial neural network.

15. The system of claim 9, wherein the instructions further comprise generating an embedded representation of the first speech sample, wherein the embedded representation is generated by a third trained ML model, wherein the third trained ML model is trained to generate the embedded representation using language-independent training data.

16. A non-transitory computer-readable medium storing instructions that, when executed by one or more processors, cause the one or more processors to perform operations including:

receiving a first speech sample, the first speech sample characterized by a first voice and spoken in a first language;

receiving a text input in a second language, wherein the second language is a low-resource language;

generating, by a first trained machine learning ("ML") model trained using low-resource training data, to encode the text input to an encoded representation that characterizes the text input spoken in a second voice in the second language, a first encoded representation of the text input;

generating, by a second trained ML model trained using high-resource training data, to generate a spectrogram based on the first encoded representation of the text input spoken in the second language, a first spectrogram of the text input, the first spectrogram characterized by the text input spoken in the first voice in the second language, wherein the first trained ML model is different from the second trained ML model; and generating an audio output based on the spectrogram.

17. The non-transitory computer-readable medium of claim 16, wherein training the first trained ML model to encode the text input to the encoded representation that characterizes the text input spoken in the second voice in the second language comprises:

accessing a third trained ML model, wherein the third trained ML model is an automatic speech recognition encoder trained to generate the encoded representation;

generating, by the third trained ML model, the encoded representation of the text input spoken in the second voice in the second language; and training the first trained ML model to generate the encoded representation generated by the third trained ML model.

18. The non-transitory computer-readable medium of claim 16, further comprising generating an embedded representation of the first speech sample, wherein the embedded representation is generated by a third trained ML model, wherein the third trained ML model is trained to generate the embedded representation using language-independent training data.

19. The non-transitory computer-readable medium of claim 16, wherein:

the first trained ML model is a first transformer comprising one or more first transformer blocks and one or more first feed-forward blocks; and the second trained ML model is a second transformer comprising one or more second transformer blocks and one or more second feed-forward blocks.

20. The non-transitory computer-readable medium of claim 16, wherein:

the first spectrogram is a Mel spectrogram; and generating the audio output based on the first spectrogram comprises:

receiving, by a vocoder, the Mel spectrogram, wherein the vocoder is a trained generative adversarial neural network;

generating an audio waveform based on the Mel spectrogram; and playing back the audio waveform using an audio output device.

* * * * *